United States Patent [19]

Stapleton

[11] Patent Number: 5,153,445
[45] Date of Patent: Oct. 6, 1992

[54] METHOD AND APPARATUS FOR MEASURING ORANGE PEEL AND TEXTURE IN PAINTED SURFACES

[75] Inventor: Thomas T. Stapleton, Bloomfield Hills, Mich.

[73] Assignee: General Motors Corporation, Detroit, Mich.

[21] Appl. No.: 733,909

[22] Filed: Jul. 22, 1991

[51] Int. Cl.⁵ .................. G01N 21/88; G01B 11/30
[52] U.S. Cl. .................... 250/572; 356/237; 356/445
[58] Field of Search ............ 250/563, 571, 572; 356/237, 445

[56] References Cited

U.S. PATENT DOCUMENTS

| | | | |
|---|---|---|---|
| 4,291,990 | 9/1981 | Takesu | 356/237 |
| 4,464,050 | 8/1984 | Kato et al. | 356/237 |
| 4,465,371 | 8/1984 | Pernick | 356/445 |
| 4,547,073 | 11/1985 | Kugiyama | 356/445 |
| 4,556,903 | 12/1985 | Blitchington et al. | 356/237 |
| 4,585,343 | 4/1986 | Schave et al. | 356/237 |
| 4,598,998 | 7/1986 | Kamei et al. | 356/376 |
| 4,629,319 | 12/1986 | Clarke et al. | 356/446 |
| 4,715,709 | 12/1987 | Sekine et al. | 356/237 |
| 4,732,473 | 3/1988 | Bille et al. | 250/560 |
| 4,746,805 | 5/1988 | Stapleton | 250/571 |
| 4,861,164 | 8/1989 | West | 356/237 |
| 4,989,984 | 2/1991 | Salinger | 356/445 |

FOREIGN PATENT DOCUMENTS

| | | | |
|---|---|---|---|
| 15142 | 1/1988 | Japan | 250/572 |
| 297503 | 11/1989 | Japan | 356/237 |

Primary Examiner—Carolyn E. Fields
Attorney, Agent, or Firm—Robert M. Sigler

[57] ABSTRACT

Orange peel or texture of a painted surface is measured by scanning a light beam across the surface and receiving the reflected beam on an area detector generating a signal having a first component varying with surface slope variations in the painted surface and a second component due to scan rate. Apparatus is provided for orienting the light beam relative to the painted surface so as to be reflected therefrom to the detector area without re-reflection from the painted surface; and a converging lens converges the light beam on the area detector. A portable, surface contacting embodiment uses a plurality of projecting feet for orientation to the painted surface and relies on the converging lens for convergence. In a non-contact embodiment, variations in orientation and curvature of the surface are detected by the second component of the signal and compensated for in closed loop control of a mirror and the converging lens to dynamically converge the beam on the area detector.

13 Claims, 7 Drawing Sheets

METHOD AND APPARATUS FOR MEASURING ORANGE PEEL AND TEXTURE IN PAINTED SURFACES

BACKGROUND OF THE INVENTION

This invention relates to the measurement of finish quality of a painted surface and particularly to a method and apparatus of measuring paint surface irregularities such as orange peel and texture.

Painted articles have varying degrees of surface roughness or irregularity which may be unacceptable to users of the articles. Automotive vehicles and appliances, for example, have high quality requirements for paint appearance. A common type of paint condition is orange peel, which comprises roughly sinusoidal surface undulations. To determine acceptable quality of a painted product it is necessary to measure the severity of orange peel and compare it to known standards. Orange peel is a paint condition in which the paint surface includes numerous bumps having wavelengths in the range of approximately 0.5 to 10 millimeters. Orange peel gives the painted surface a rough, hilly appearance, in which the individual bumps creating the roughness can be seen. The common practice for measuring orange peel is to subjectively compare standard panels having varying degrees of orange peel with the article being inspected. Such subjective inspection is marked by inconsistency due in part to different inspectors.

Texture is associated with bumps and linear striations in the paint surface having wavelengths smaller than 0.5 millimeters. The effect of texture is seen most easily in its absence, in that a painted surface lacking texture has a shiny "wet look". Where texture is present, it is difficult to quantify using the visual methods commonly used for orange peel, since the individual bumps and striations which create the texture are too small to be individually seen without the assistance of special instruments. Essentially, a painted surface without the "wet look" has texture; but there is no prior art method for quantifying texture in manufacturing inspections.

There have been some instruments proposed to measure orange peel. For example, the paper "New Portable Orange Peel Meter for Paint Coatings", Matsuta et al, ISCC Conf., 1988, discusses a system which projects a rectangular wave pattern onto a surface, detects the reflected pattern by a linear image sensor and analyzes the distortion in the image. The meter was applied to surfaces with a radius of curvature of 1 meter or more. The measured distortion may be the result of dust or other surface flaws in addition to orange peel, and is limited to relatively large features.

An additional prior art publication, U.S. Pat. No. 4,629,319 to Clarke et al discloses apparatus for detecting surface defects such as dents, creases, low spots, and flat spots, as well as, allegedly, paint defects such as orange peel. An embodiment of the apparatus described in the Clarke et al disclosure scans a light beam across a painted surface and receives the beam reflected from the painted surface on an area detector which generates a signal indicative of the position on the detector surface struck by the reflected beam. The beam striking the area detector, over time, generates a signal which varies to indicate surface irregularities as the beam is scanned. One component of this signal, which is considered "background noise" in the detection of large scale dents and bumps in the surface underlying the paint, may be considered indicative of the paint surface itself and may thus indicate the degree of orange peel.

It is, however, necessary to converge the reflected light beam on the area detector as the beam is scanned, and especially if the surface is curved or otherwise changes its orientation to the light beam generating apparatus. The Clarke et al apparatus uses a retroreflective screen to redirect the reflected beam back along its path to be re-reflected from the painted surface back to a beam splitter and, from there, to the area detector. In this way, a portion of the beam is always redirected back toward the source and beam splitter (and thus the area detector) regardless of the orientation or curvature of the painted surface to the apparatus or the scan direction.

However, as useful as this apparatus may be for detection of large scale surface effects such as bumps, dents, flat spots, etc. in the metal or plastic panel underlying the paint, it becomes progressively less useful as the size of the surface irregularities to be detected becomes smaller. Although the patent disclosure states that it may be used to detect orange peel, it further states that a resolution of 0.05 inches (1.25 mm) is sufficient for most geometric defects of interest. This would be sufficient for the larger sizes of orange peel defects (1.25 to 10 mm) but not for the smaller sizes (0.5 to 1.25 mm) and certainly not for the even smaller irregularities of texture. Actually, its usefulness for any accurate orange peel measurement is questionable. The basic reason for this is the second reflection of the beam from the painted surface after being redirected back by the retroreflective screen. The beam after its first reflection from the painted surface may contain the information desired to determine the degree of orange peel and/or texture, provided that the beam is focused to a sufficiently small size at the surface to be significantly affected by the irregularities to be detected. However, the retroreflective screen allows the beam to spread in a cone of a few degrees, so that the beam hitting the painted surface the second time on its way back to the beam splitter has a much larger spot area on the surface. Different parts of the beam strike small parts of the surface having greatly different slopes and orientations and are scattered, so that the information in the beam from the first reflection is significantly degraded by the second reflection. The effect is a loss of detail which obscures irregularities of small size.

It is thus desired to direct the beam in such a way that it converges on the area detector, regardless of the changing scan direction and possibly changing orientation or curvature of the painted surface, after only a single reflection from the painted surface and, preferably, without the use of a retroreflective screen.

SUMMARY OF THE INVENTION

The invention is thus an apparatus and method for objectively measuring the surface irregularities such as orange peel and/or texture of a painted surface. A light beam is focused on the painted surface and scanned across the painted surface at a predetermined scan rate. The specular reflection of the light beam is detected at an area detector to yield a signal which has a first component varying rapidly according to surface slope variations that arise from the surface paint irregularities and a second component that varies more slowly with scan rate. Apparatus is provided to orient the light beam relative to the painted surface so that the light beam is reflected therefrom to the area detector without re-reflection from the painted surface; and a converging lens converges the light beam on the area detector.

In one embodiment suitable for a portable, surface contacting apparatus, the apparatus is enclosed in a case having a plurality of projections for engaging the painted surface and orienting the light beam relative thereto, with the converging lens producing convergence within predetermined limits of curvature of the painted surface. In another embodiment more suited for assembly line inspection with relative movement between the apparatus and the painted surface, convergence of the light beam on the area detector is controlled dynamically in response to the second component of the signal.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 1:
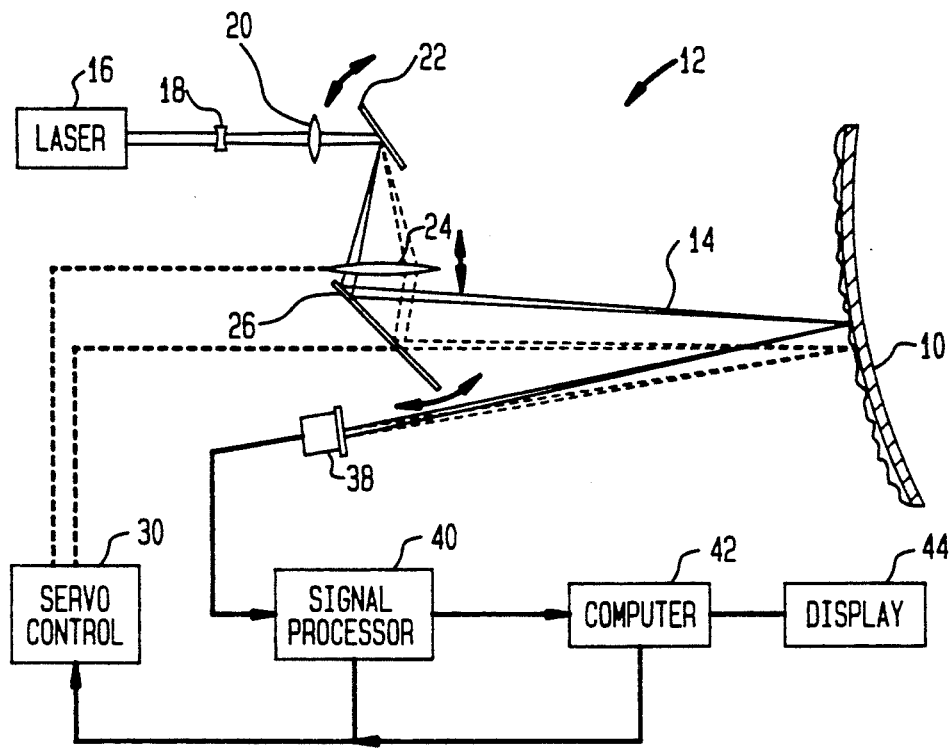
FIG. 1 is a schematic diagram of a first embodiment of apparatus according to the invention.

In the embodiment shown in FIG. 1 the painted surface 10 (shown in cross-section) represents the side of an automotive vehicle which is moving horizontally (into the paper) on a conveyor while the measuring system 12 scans a laser beam 14 vertically in a short stroke so that a narrow strip along the side of the vehicle or along the surface 10 is inspected. A laser 16 or other light source generates the beam 14 which is expanded and then focused by lenses 18 and 20, respectively, to form a slightly convergent beam 14 which is reflected by a beam control mirror 26 and comes to focus on the painted surface 10 having a spot diameter of about 0.02 to 0.1 mm. The beam is specularly reflected from painted surface 10 to an area detector 38. An oscillating scanning mirror 22 produces a vertical scanning movement of the beam, and an objective or converging lens 24 is placed in the beam to keep the reflected beam on detector 38 as it is scanned. Scanning mirror 22 is mounted to pivot about one axis and is driven by a motor, not shown, to oscillate in a manner to sweep the beam 14 across the diameter of the lens 24 and therefore also scan the surface. The scan rate is preferably 100 to 400 Hz and results in several scans per inch as the surface moves transverse to the scan direction. The scan distance across the surface is approximately 20 mm. Objective lens 24 is shown in a preferred location prior to beam control mirror 26; however, it may be placed in the path of the beam reflected from painted surface 10 and still accomplish its purpose.

Figure 2:
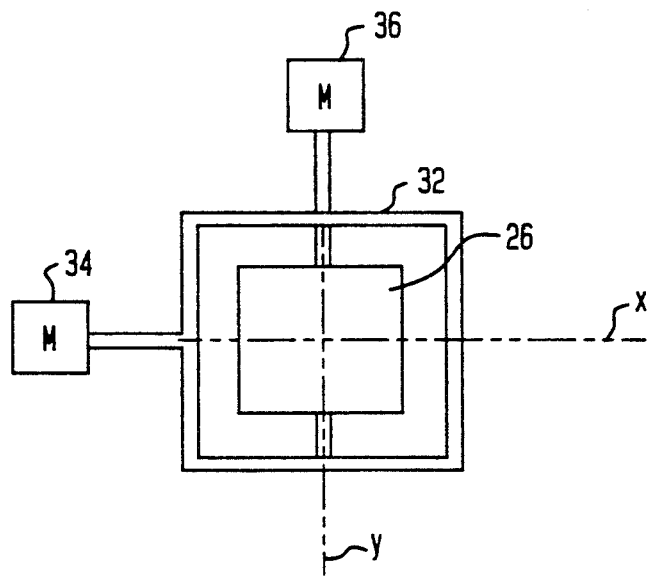
FIG. 2 is a schematic view of a movable mirror of FIG. 1 and its drive apparatus.
Figure 11A:
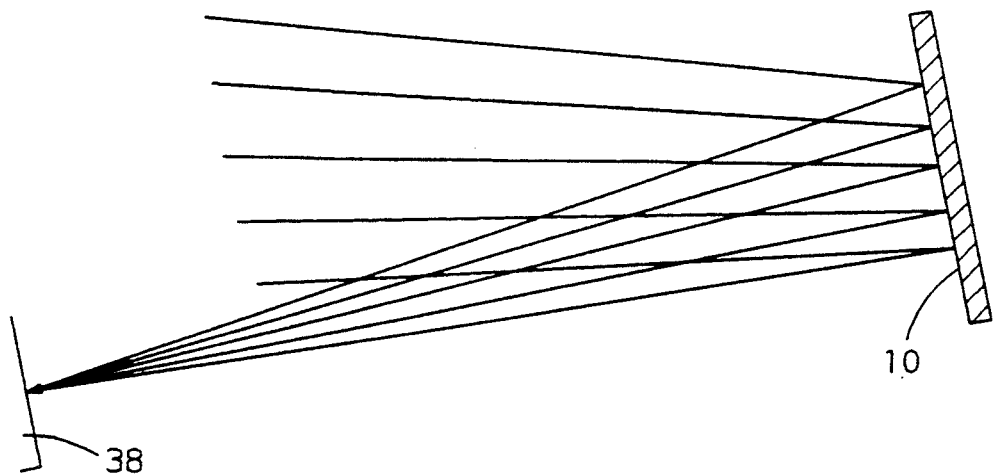
FIG. 11A and 11B are patterns of light beams on a detector reflected from flat and curved surfaces, respectively.
Figure 11B:
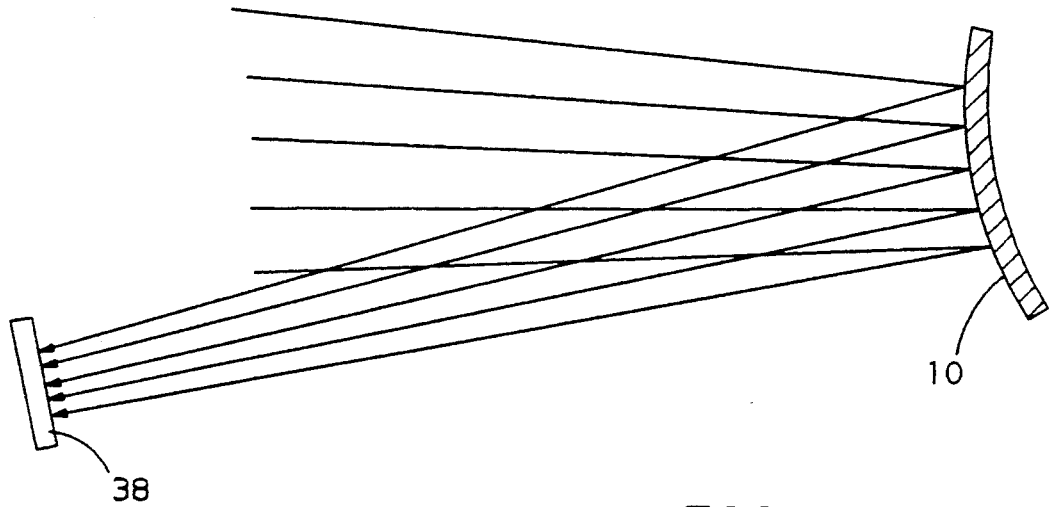

If painted surface 10 is flat or of a constant curvature and does not change its angular orientation to the detecting apparatus, objective lens 24 can be designed so as to keep the reflected beam centered on a single point on detector 38. This is illustrated in FIG. 11A, in which lens 24 is designed to converge the reflected beam from a flat surface. However, this is an unlikely situation with vehicle body parts. More usually, slight curvature or changes in the orientation will cause the reflected beam to move from this point as it is scanned, as illustrated in FIG. 11B; and large curvatures or angular changes may move the beam completely off detector 38. Therefore the apparatus may include additional beam control features. Objective lens 24 may be axially shiftable and control mirror 26 may be rotatable about two perpendicular axes in response to a servo control 30. The servo portion which drives the lens 24 uses a linear actuator to shift the axial position of the lens in accordance with control signals to be described. The servo portion which drives the control mirror 26 and the mirror mounting are shown in FIG. 2. A gimbal arrangement having a yoke 32 rotatably moved about an x axis by a motor 34 carries the mirror 26 as well as another motor 36 for moving the mirror about the y axis. The motors 28, 34 and 36 may be galvanometer movements, for example.

The beam 14 which is specularly reflected from the surface is incident on a surface area of a position sensitive or area detector 38, e.g. a beam measuring system model No. 431 manufactured by UDT Corporation. Such a detector has an output independent of light intensity; but it is, rather, sensitive to the position of the light beam 14 relative to x and y axes on the sensing surface area and provides two signal outputs, $E_x$ and $E_y$, each having an amplitude proportional to the distance to the beam from the x and y axes, respectively. If the signal is spread over a portion of the sensing surface area, the signals indicate the moment center of the signal area. The axes are aligned with the corresponding axes of the mirror 26 so that mirror rotation about an axis will affect the beam position relative to the corresponding detector axis. The detector 38 outputs are fed to a signal processor 40 which is connected to the servo control 30 and to a microcomputer 42. The microcomputer 42 may conveniently drive a display 46.

Figure 3:
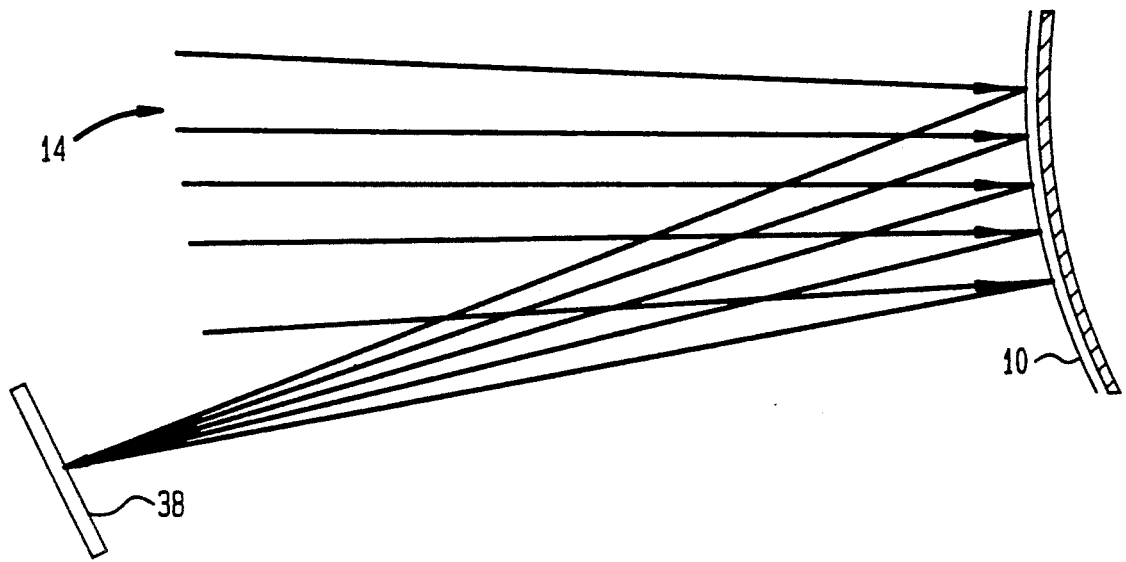
FIGS. 3 and 4 are diagrams of beams reflected from smooth and orange peel surfaces, respectively.
Figure 4:
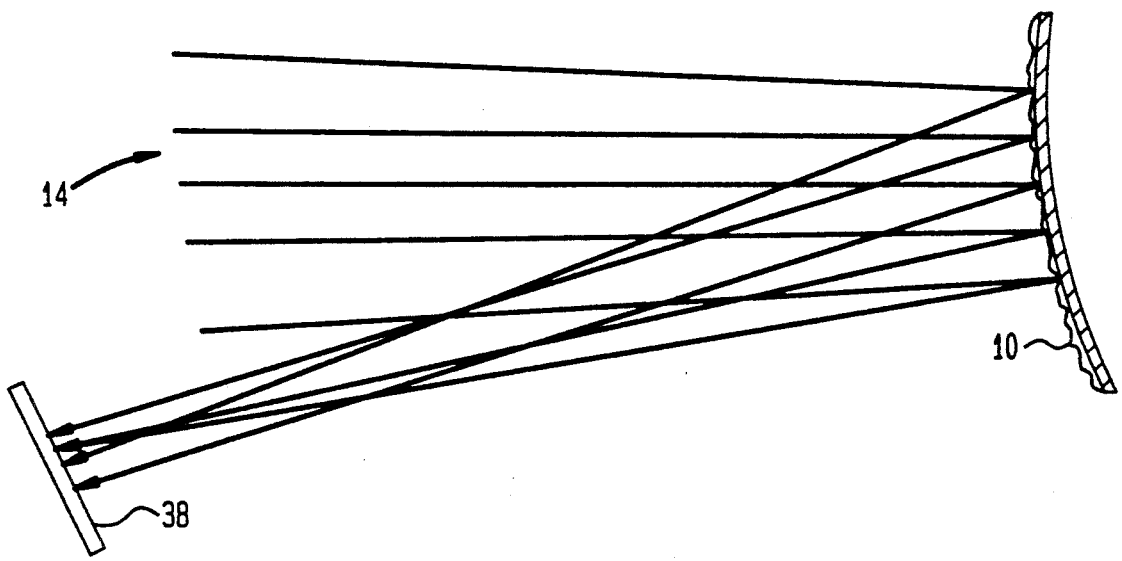
Figure 5A:
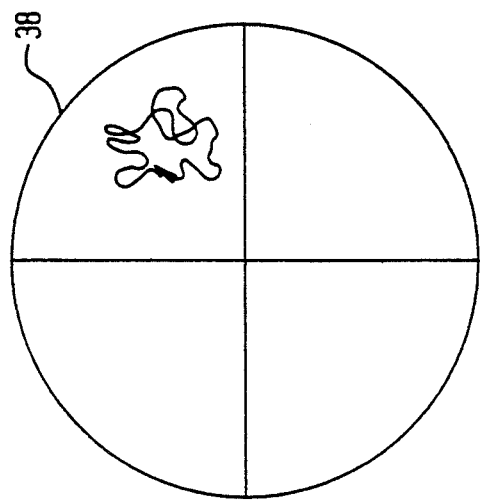
FIGS. 5A and 6A are patterns of light beams on a detector of centered and off-center conditions, respectively.
Figure 5B:
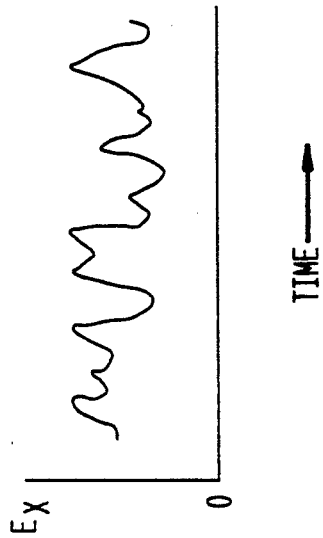
FIG. 5B and 6B are detector signals developed for the patterns of FIGS. 5A and 6A, respectively.
Figure 7:
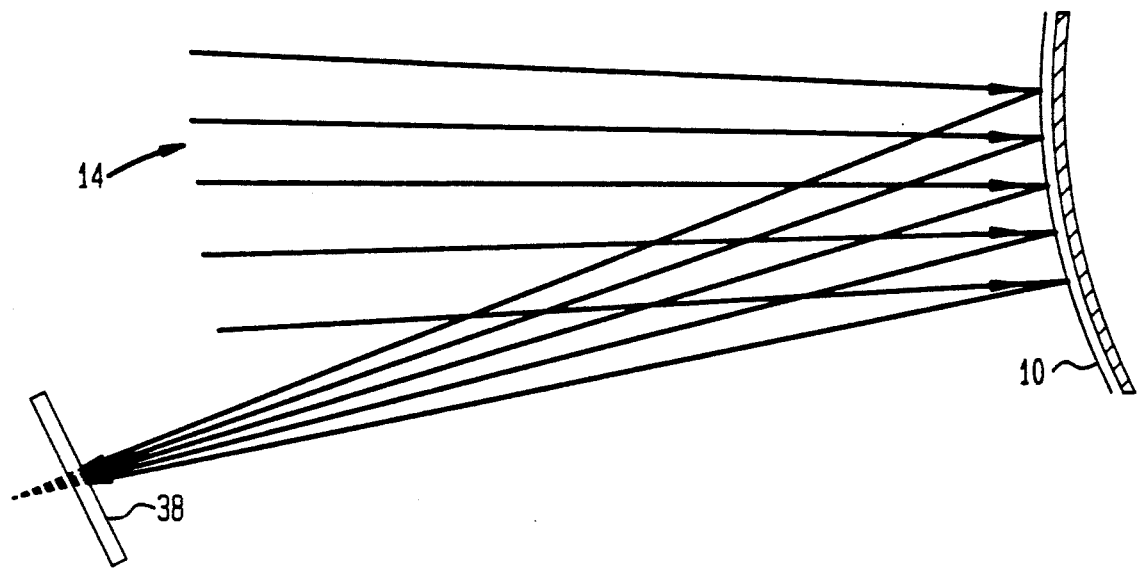
FIG. 7 is a diagram of beams reflected from a smooth surface and not converging on the detector.

In FIGS. 3, 4 and 7 the beam at different scan positions is shown by rays or beam axes representing the beams. A beam reflecting from a smooth surface (no orange peel) as shown in FIG. 3, will converge to a single spot on the detector and remain there throughout the scan. A beam reflecting from a surface with orange peel will, because of the variation in surface slope caused by the orange peel, vary in position at the detector and the extent of the variation will be proportional to the slope variation (FIG. 4). The position sensing detector will therefore generate an electronic signal for each axis whose amplitude is proportional to the surface slope variation and whose frequency is proportional to the spatial frequency of the orange peel. When the beam is optimally aimed, the incident spot on the detector moves about the surface of the detector but its average position is at the center of the detector as shown in FIG. 5A. FIG. 5B shows the corresponding signal $E_x$ (centered on the axis); signal $E_y$ is similar.

Figure 12:
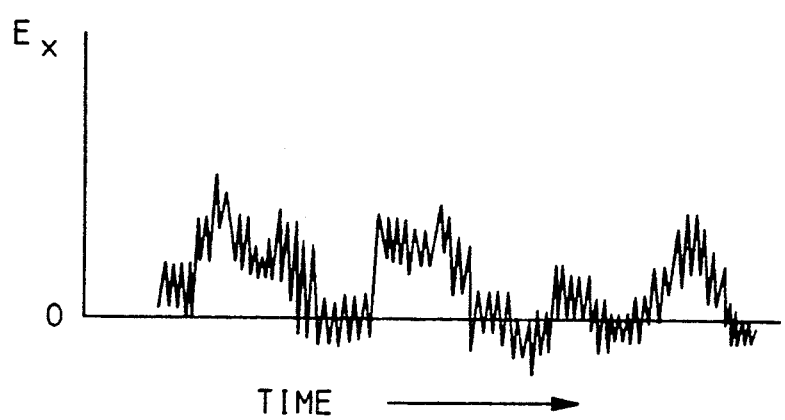
FIG. 12 is a detector output signal for a painted surface having both orange peel and texture.

A similar result is obtained for texture, except that the curve shows a higher frequency variation. FIG. 12, for example, shows the result when texture is added to the orange peel shown in the curve of FIG. 5B. Texture shows up as a higher frequency ripple on the lower frequency variation due to orange peel. The different frequency components due to orange peel and texture may be separated by frequency discriminating circuitry for separate measurements of each.

Figure 6A:
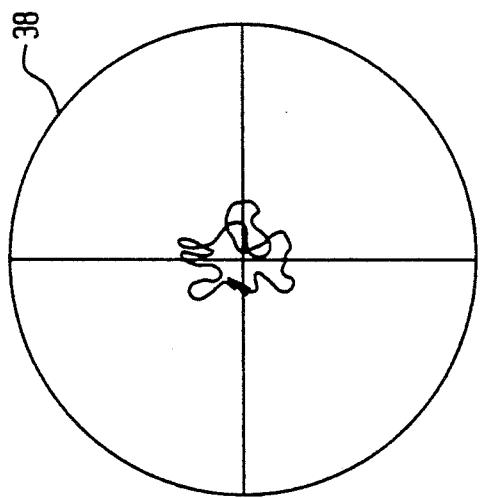
Figure 6B:
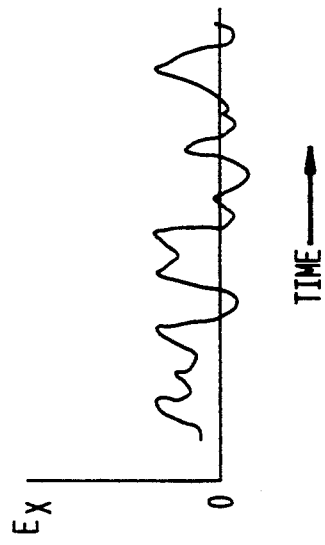

If the vehicle comprises convex surfaces of various curvatures, the scan of the apparatus may encounter surface portions of various slopes and various curvatures. In this case, the orientation of the surface relative to the beam may change. This would have the effect of moving the pattern on the detector 38 away from the center, as shown in FIG. 6A, and could even move the beam out of the field of view of the detector. When the pattern is off center, the detector signal will be biased off-axis, as shown in FIG. 6B for the signal $E_x$. The signal causing the bias changes very slowly compared to the orange peel signal and can be easily filtered from the high frequency signal due to the orange peel.

Figure 8:
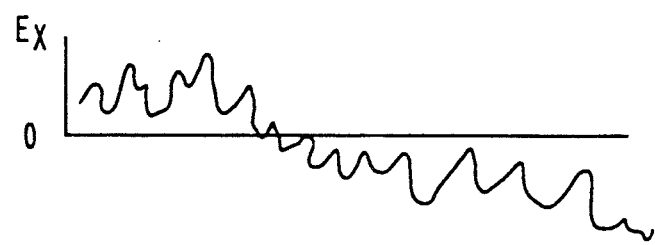
FIG. 8 is a detector output signal for a condition of nonconvergent beams reflected from an orange peel surface.

Another cause of movement of the beam from the center of the detector 38 is a change of curvature of the surface. FIG. 3 illustrates the scan convergence of the beam axes to the center of the detector 38 for different beam positions along its scan path for a smooth surface having a constant curvature. As shown in FIG. 7, a greater surface curvature causes the beam axes to converge at a point beyond the detector. A different distance to the surface also causes the same effect. This results in a linear motion of the beam at the detector in phase with the beam scan. This linear motion is added to the motion due to orange peel and results in a tilted signal as shown in FIG. 8 which is for the conditions of nonconvergence and orange peel on the surface. In extreme cases the linear motion can carry the beam off the detector and thus should be minimized or eliminated. The nonconvergence can be readily detected by comparing the bias of the beam during the first and second halves of the scan and can be used to control the beam scan convergence.

Figure 9:
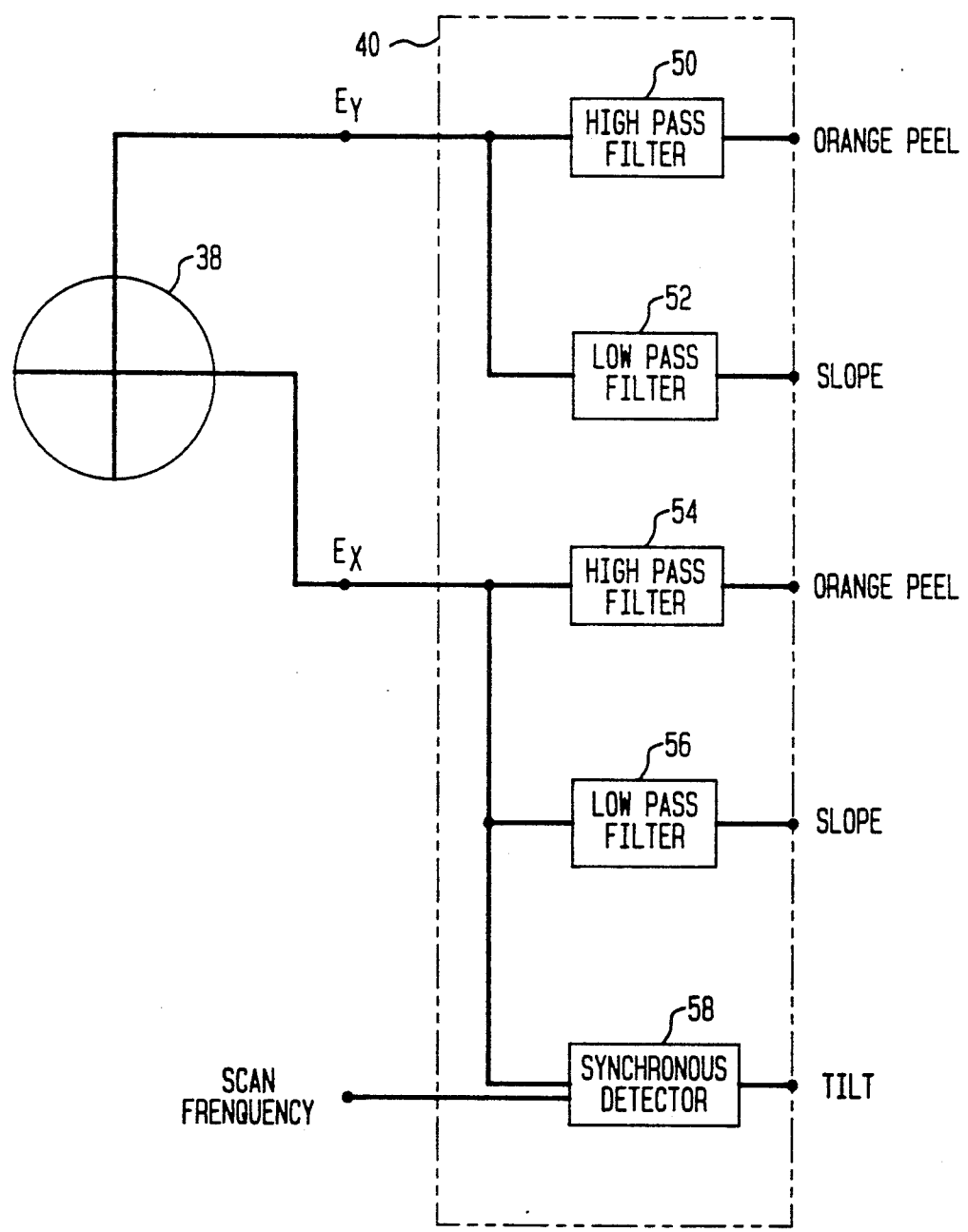
FIG. 9 is a schematic diagram of the signal processor of FIG. 1.

The various components of the signal from the detector 38 are separated in the signal processor 40, which is schematically shown in FIG. 9. A high pass filter 50 and a low pass filter 52 are coupled to the signal $E_y$ from the detector 38 to derive the high frequency signal due to orange peel or texture and the slowly varying bias signal due to surface slope. If both texture and orange peel are to be separately measured, a bandpass filter may be used for the orange peel and a high pass filter for the texture. The cutoff frequencies for each would be determined from the size range of the surface bumps associated with each and the scanning rate of mirror 22, with the bandpass filter tuned to a range between that of the high and low pass filters. Similarly, a high pass filter 54 and a low pass filter 56 coupled to the $E_x$ signal yield a high frequency signal due to orange peel or texture and the slowly varying bias signal due to surface slope. In addition a synchronous detector 58 coupled to the signal $E_x$ and to a scan frequency signal separates out the tilt signal due to nonconvergence. The tilt signal is fed to the computer which separately averages the first half and the second half of the tilt signal and compares the two halves to determine the amount and direction of nonconvergence and to generate a corresponding output signal. That output signal is fed to the servo control 30 along with the surface slope signals for controlling the beam position. The orange peel signals and/or texture signals are used by the computer to make a determination of orange peel and/or texture.

The servo control may use the slowly changing slope signals for both the x and y axes to move the mirror 26 via motors 34 and 36 in a direction to diminish the signals thereby moving the average beam position to the center of the detector 38. This closed loop insures that the system will keep the reflected beam in view when the slope of the surface changes as the vehicle moves horizontally past the measuring system 12. The servo control 30 also uses the computer signal derived from the component of the $E_x$ signal which varies with the scan rate to axially move the lens 24 in a direction to move the beam convergence point to the detector surface. This latter closed loop keeps the reflected beam in view when the curvature or distance to the surface changes as well as minimizing the tilt component of the signal.

Figure 10:
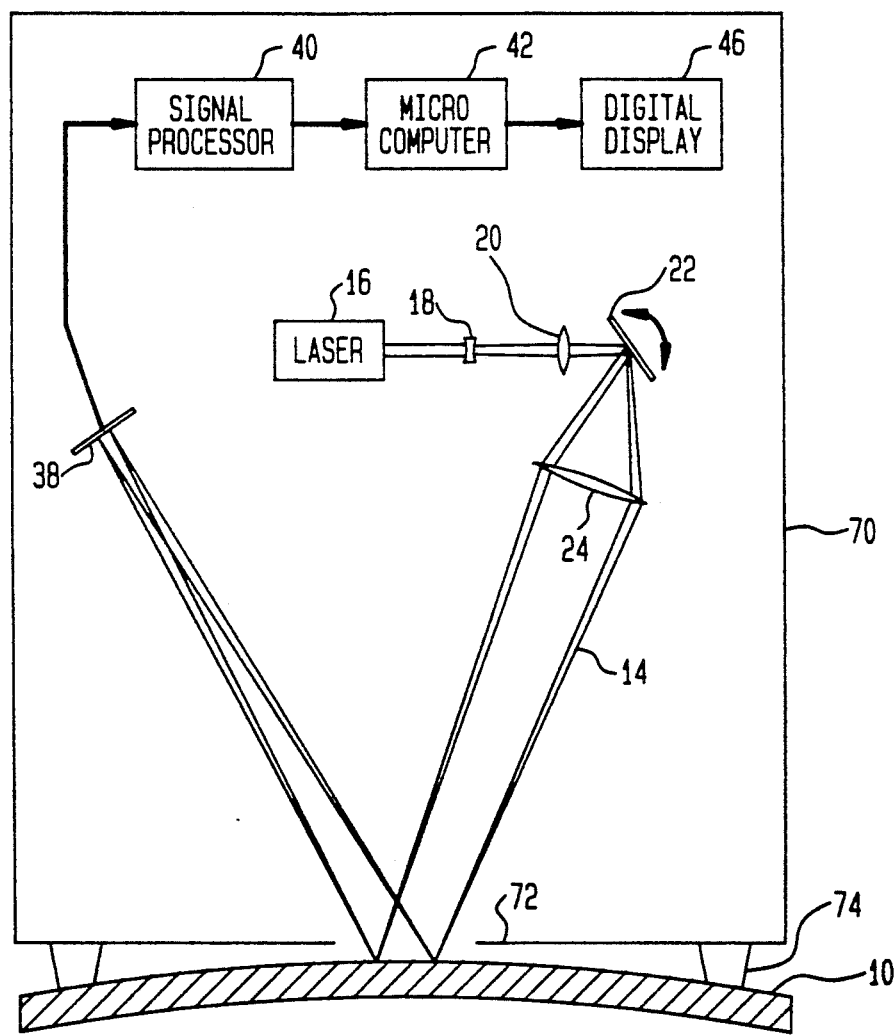
FIG. 10 is a schematic diagram of a second embodiment of apparatus according to the invention.

The system as described above is adapted for use in a non-contact fashion mounted alongside the path of the vehicle or other painted part at some prescribed standoff distance from the surface. However, a portable instrument which does make contact with the part is another embodiment of the invention. As shown in FIG. 10, a housing 70 having an opening 72 in one side has three projecting feet or contact pads 74 on the same side spaced around the opening for positioning the instrument on a painted surface 10. This surface contact arrangement orients the system to the slope of the surface so that the control mirror 26 and its associated servo control are not needed, at least up to predetermined limits of curvature in painted surface 10. Similarly, there is no need for axial control of objective lens 24. The other components of the FIG. 1 system are embodied in the housing 70. Thus the portable instrument can be placed against a surface and held stationary while the painted surface irregularity measurement is made. The unit will accommodate a certain degree of curvature of painted surface 10, up to the point where the curvature is sufficient to move the reflected beam off detector 38; and, of course, a servo control of converging lens 24 as described above for the embodiment of FIG. 1 could be added to accommodate highly curved surfaces.

The fact that the apparatus may be designed to produce a single, unmoving spot on the area detector for a constant, predetermined curvature and orientation of surface 10 presents the possibility of also using the apparatus for measuring curvature. The apparatus of FIG. 10 provides a predetermined orientation between the light beam and surface 10 by means of the three surface contacting feet 74. If objective or converging lens 24 is designed to produce a single, unmoving spot on area detector 38 with light beam scanning across a surface of predetermined curvature (e.g., zero or flat, as illustrated in FIG. 11A), then the amplitude of the lower frequency signal component used in the other embodiment for dynamic convergence control will provide an indication of degree of curvature, since the more the curvature varies from the predetermined curvature the more the spot will move across the area detector at the scan rate, as illustrated in FIG. 11B for one value of curvature. Thus, the portable surface contacting apparatus of FIG. 10 may provide low pass filters similar to filters 52 and 56 for passing the component of the signal from area detector 38 varying at the frequency of the scan rate as a surface curvature output signal.

The embodiments of the invention in which an exclusive property or privilege is claimed are defined as follows:

1. Apparatus for measuring surface paint irregularities of a painted surface comprising, in combination:
   means for generating a light beam and focusing the light beam on the painted surface;
   means for scanning the light beam across the painted surface at a predetermined scan rate;
   means for detecting the specular reflection of the light beam at a detector area to yield a signal which has a first component that varies rapidly according to surface slope variations that arise from the surface paint irregularities and a second component that varies more slowly with the scan rate;
   means for orienting the light beam relative to the painted surface so as to be reflected therefrom to the detector area without re-reflection from the painted surface; and
   a converging lens for converging the light beam on the area detector as the light beam is scanned.

2. The apparatus of claim 1 in which the focusing means focuses the light beam on the painted surface with precision sufficient to distinguish surface irregularities comprising orange peel having wavelengths between 0.5 and 10 millimeters.

3. The apparatus of claim 1 in which the focusing means focuses the light beam on the painted surface with precision sufficient to distinguish surface irregularities comprising texture having wavelengths smaller than 0.5 millimeter.

4. The apparatus of claim 1 in which the means for orienting the light beam relative to the painted surface comprises a supporting case for the apparatus having a plurality of projections for contact with the painted surface.

5. The apparatus of claim 4 further having means for deriving from the amplitude of the second component of the signal an output signal indicating curvature of the painted surface.

6. The apparatus of claim 1 in which the means for orienting the light beam relative to the painted surface dynamically controls the convergence of the light beam on the detector area by movement of a light directing element in accordance with the second component of the signal.

7. Apparatus for measuring surface paint irregularities of a curved painted surface comprising:
   a light beam source,
   lens means for focusing the light beam on the painted surface,
   an area detector for receiving the light beam reflected from the painted surface and generating signals dependent on the position of the reflected light beam;
   means for scanning the beam across the painted surface;
   means for orienting the light beam relative to the painted surface so as to reflect therefrom to the area detector without re-reflection from the painted surface; and
   means for compensating for changing curvature of the painted surface comprising a converging lens in the path of the beam for affecting the beam scan convergence and means for moving the converging lens for controlling the beam scan convergence,
   whereby the presence of paint irregularities in the painted surface gives rise to a beam movement and a detector signal indicative of the severity thereof.

8. The apparatus as defined in claim 7 wherein a change in curvature of the painted surface causes the beam to traverse the detector and yield a signal component at the frequency of the scan rate, and the means for moving the converging lens includes a motor coupled to the converging lens and a closed loop circuit responsive to the signal component at the frequency of the scan rate for controlling the motor to maintain the beam scan convergence substantially independently of the changing curvature.

9. The apparatus as defined in claim 7 including closed loop means for compensating for varying orientation of the painted surface wherein a change of orientation causes the average position of the beam on the detector to be displaced from the center of the detector thus giving rise to a slowly changing signal component, the closed loop means comprising a movable mirror in the path of the beam for altering the beam direction, a motor drivingly coupled to the movable mirror, and circuit means for detecting the slowly changing signal component and for driving the motor to move the average beam position to the center of the detector.

10. The method of measuring surface paint irregularities of a curved painted surface comprising the steps of:
    focusing a light beam onto the surface and scanning the beam across the surface;
    detecting the specular reflection of the light beam at a detector area to yield a signal which has a component that varies rapidly according to surface slope variations that arise from the surface paint irregularities and another component that varies with the rate of scanning the beam; and
    compensating for changes in curvature of the surface by directing the beam axes for different scan positions to converge at the detector area and dynamically controlling the convergence in accordance with the component of the signal that varies with scan rate,
    whereby the rapidly varying component is a measure of the severity of the surface paint irregularities.

11. The method of measuring orange peel of a curved painted surface comprising the steps of:
    focusing a light beam onto the surface and scanning the beam across the surface;
    detecting the specular reflection of the light beam at a detector area to yield a signal which has a component that varies rapidly according to local surface slope variations that arise from orange peel, another component that varies slowly according to changes in slope of the surface, and a further component that varies with the rate of scanning the beam;
    filtering the signal to separate the said components;
    compensating for changes in curvature of the surface by directing the beam axes for different scan positions to converge at the center of the detector area and controlling the convergence in accordance with the component of the signal that varies with scan rate; and compensating for the slope of the surface by controlling the angle of the beam in response to the slowly varying component of the signal so that the average position of the beam is at the center of the detector, whereby the rapidly varying component is a measure of the severity of orange peel.

12. Apparatus for measuring surface paint irregularities of a painted surface comprising, in combination:
   means for generating a light beam;
   means for focusing the light beam onto the painted surface;
   means for scanning the light beam across the painted surface in an oscillatory manner;
   an area detector for receiving the light beam specularly reflected rom the painted surface and generating a signal dependent on the received position of the light beam, the signal having a rapidly varying component due to reflection of the scanned light beam from the irregularities of the painted surface as the beam is scanned, which rapidly varying component is separable from any other component due to the oscillatory scanning of the light beam;
   a case for the apparatus having a plurality of projecting members adapted to contact the painted surface; and
   a converging lens in the path of the light beam effective to converge the scanned light beam within the detecting area of the area detector, the converging lens being oriented within the case so as to converge the scanned light beam on the area detector when the plurality of projecting members are all in contact with the painted surface.

13. In apparatus for measuring surface paint irregularities of a painted surface comprising means for generating a light beam, means for focusing the light beam onto the painted surface, means for scanning the light beam across the painted surface, and an area detector for receiving the light beam specularly reflected from the painted surface and generating a signal dependent on the received position of the light beam, the signal having a rapidly varying component due to reflection of the scanned light beam from the irregularities of the painted surface as the beam is scanned, apparatus for maintaining the light beam converged on the area detector comprising, in combination:
   a converging lens in the path of the light beam effective to compensate for the scanning of the beam; and
   beam redirection apparatus dynamically responsive to another component of the signal varying with the scan rate to maintain the predetermined alignment.

* * * * *